Sept. 27, 1938. J. I. WILCOXEN, SR., ET AL 2,131,546
AGRICULTURAL IMPLEMENT
Filed Aug. 4, 1937 2 Sheets-Sheet 1
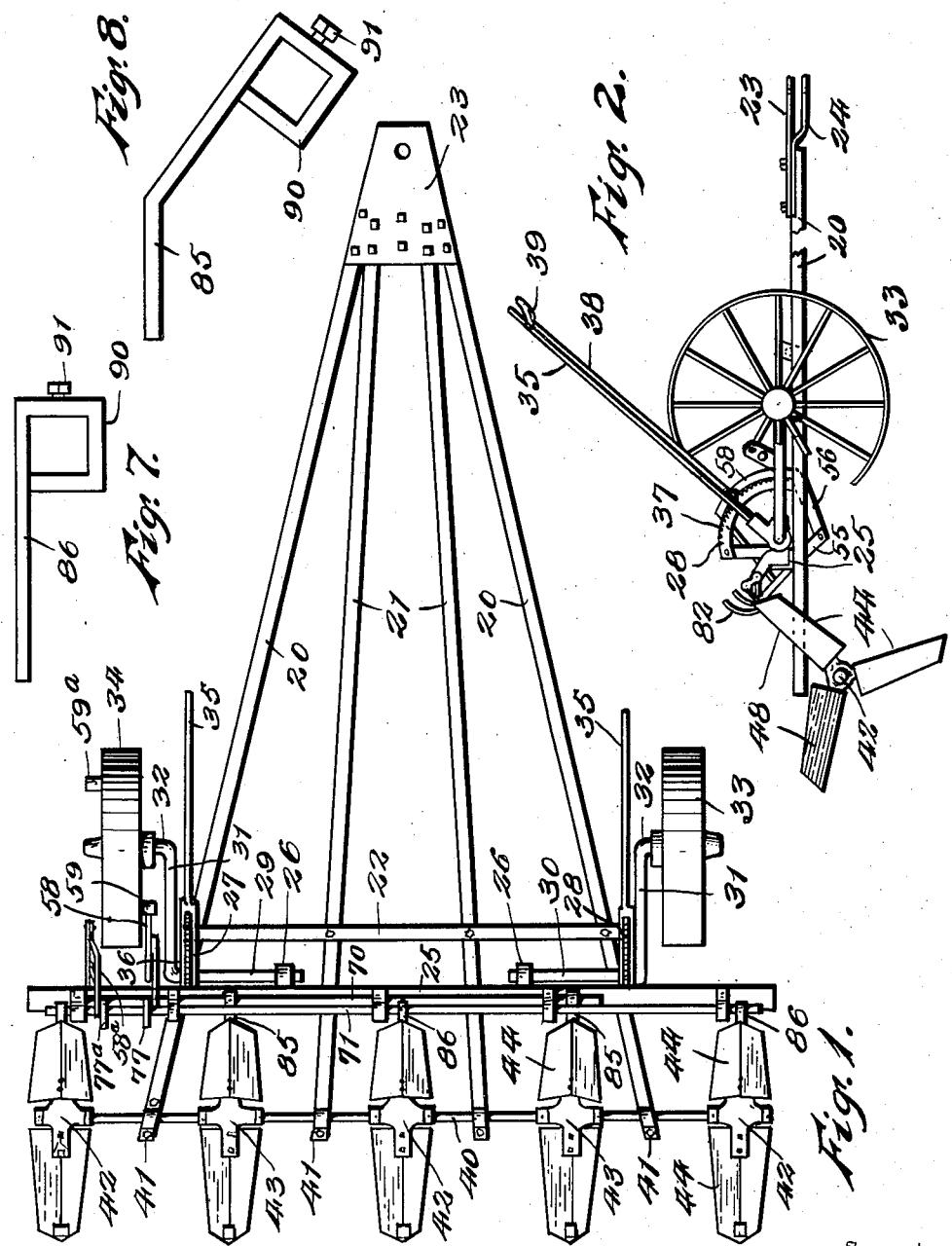
Inventors
Jesse I. Wilcoxen, Sr.,
and Jesse I. Wilcoxen, Jr.
By Christian R. Nielsen,
Attorney

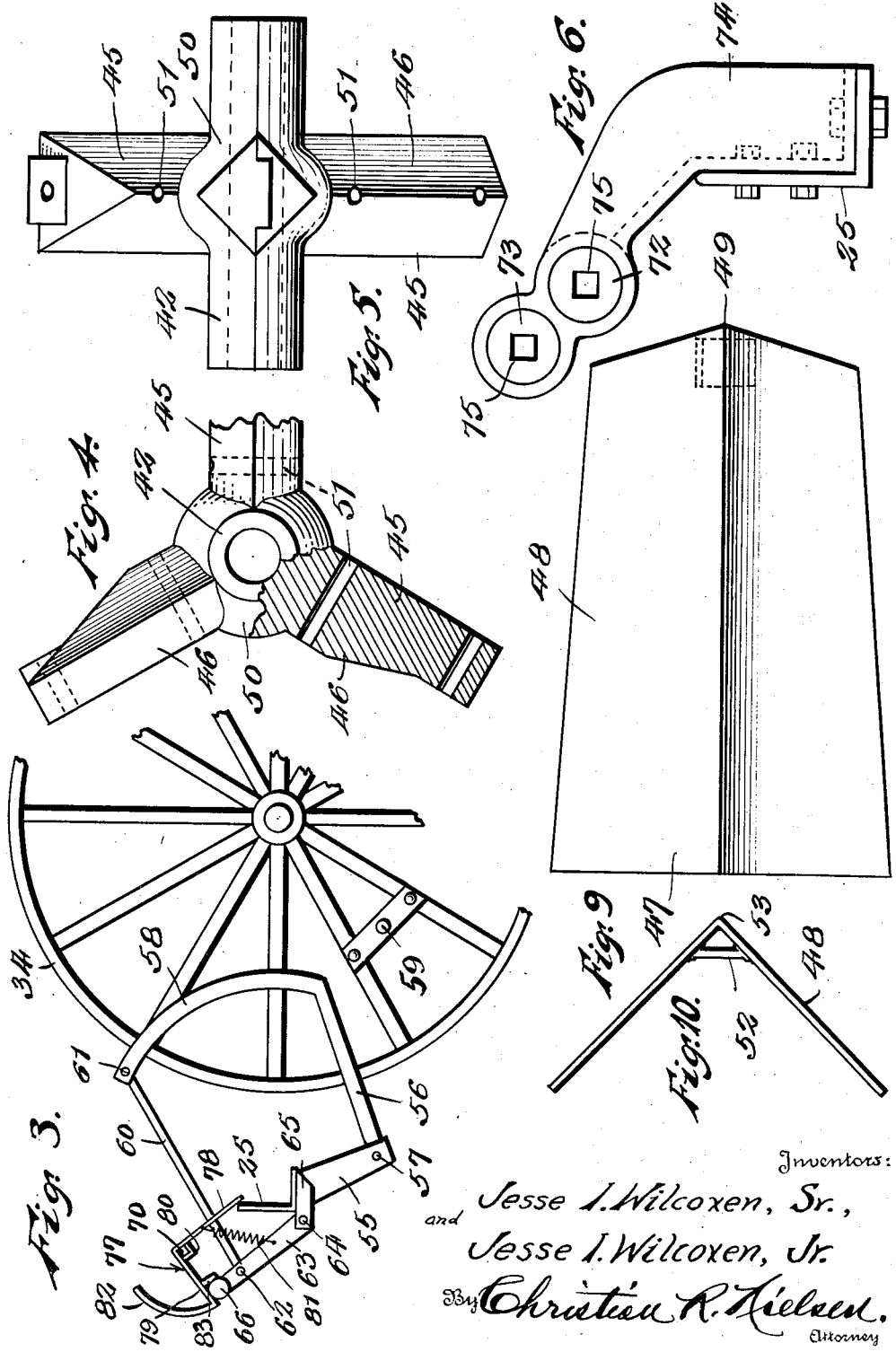

Patented Sept. 27, 1938

2,131,546

UNITED STATES PATENT OFFICE 2,131,546

AGRICULTURAL IMPLEMENT

Jesse I. Wilcoxen, Sr., and Jesse I. Wilcoxen, Jr., Ford, Kans.

Application August 4, 1937, Serial No. 157,408

7 Claims. (Cl. 97—55)

This invention relates to an agricultural implement and it consists in the constructions, arrangements and combinations herein described and claimed.

An object of the invention is the provision of a machine designed to be drawn by a plow or cultivator for creating such a condition in the soil that said soil will absorb the greatest quantity of water possible when it rains or snows and that excess water will be retained in shallow basins until the water has had time to seep into the soil, thereby preventing wind and water erosion.

Another object of the invention is the provision of a machine for forming hollows or spaced basins in a cultivated field for storing water after rains or snows, said machine being equipped with groups of revoluble spades which are automatically and periodically held against rotation and released for producing the basins.

A further object of the invention is the provision of a machine in which alternate groups of spaced spades are held periodically against rotation for producing basins in staggered relation in a cultivated field, the basins acting as reservoirs for collecting water which will seep through the soil for an equal distribution of moisture for the prevention of erosion by wind and water.

This invention will be best understood from a consideration of the description and drawings; nevertheless, it is to be understood that the invention is not confined to the disclosure, but is susceptible of such modifications which will define no material departure from the salient features of the invention as expressed in the appended claims.

In the drawings:

Figure 1 is a plan view of our machine,

Figure 2 is a reduced side view of the same,

Figure 3 is a fragmentary side view in elevation of the operating means for the spades, Figure 4 is an enlarged fragmentary side view, partly in section of the hub for the spades, Figure 5 is an enlarged end view in elevation of the hub shown in Figure 4.

Figure 6 is an enlarged side view of a bracket and bearing of certain operating shafts, Figure 7 is an enlarged side view of a finger for retaining certain of the spades against movement, Figure 8 is an enlarged side view of a second finger for retaining another group of spades against movement.

Figure 9 is a front view of one of the basin producing spades,

Figure 10 is a top plan view of the spade shown in Figure 9.

Referring more particularly to the drawings, 20 and 21 designate pairs of longitudinally disposed bars which are connected together adjacent their inner ends to a transverse bar 22. The longitudinal bars are brought together at their outer ends and are connected to a pair of spaced hitch plates 23 and 24. These bars constitute the chassis of the machine.

An angle iron 25 is secured to the longitudinal bars 20 and 21 at the rear of the bar 22. Bearings 26 are secured to the angle iron and adjacent each bearing a quadrant 27 or 28 is rigidly attached to the angle iron and projects forwardly from said iron.

A shaft 29 is mounted in a bearing 26 and a bearing in the quadrant 27, while a similar shaft 30 is mounted in the other bearing 26 and a bearing formed in the quadrant 28. Each shaft is provided with a crank 31 and an axle 32.

A wheel 33 is mounted on one axle and a wheel 34 is rotatable on the other axle.

A lever 35 has a yoke portion 36 rigidly secured to the shaft 29 and embracing the quadrant 27 provided with teeth 37 which are engaged by a pawl of the usual type, operated by a rod 38 and a hand lever 39, pivoted on said lever. A lever 35 and the associated parts just described are applied likewise to the quadrant 28 and no further description need be given of this duplicate construction.

An axle 40 is secured to the rear ends of the bars 20 and 21 as shown at 41 and carries a plurality of hubs generally designated by the numerals 42 and 43. These hubs are rotatable on the axle independently of each other. Each hub is equipped with a plurality of spades 44, and while we have shown three, more or less may be employed for the purpose. Each hub has radially projecting arms or shanks 45 provided with a V-shaped confronting edge 46 (Figures 4 and 5) which neatly fits the inner wide end 47 of a V-shaped spade 48. These spades taper slightly towards the outer free ends 49 thereof, which engage the soil to produce the basins when held against rotation.

Each hub has an elongated bearing 50 which is received by the axle 40 and is held against sliding movement in any approved manner. The arms 45 are provided with passages 51 to receive bolts for connecting the spades to said arms.

The outer reduced free end 49 of each spade is reinforced by a bar 52, for aiding in maintaining the shape of the spade so that the front edge 53 will be kept straight by the inclined side walls of the spade.

An operating device for the various series of spades is shown in Figures 1 and 3. A bracket 55 is secured to the angle iron 25 adjacent the inner face of the wheel 34. An arm 56 is pivoted at 57 to the lower end of the bracket and has a curved cam portion 58 extending upwardly from the free end of the arm which is adapted to be engaged by a pin 59 on the inner face of the wheel. A link 60 has one end pivoted at 61 to the free end of the cam portion, while the other end is pivoted at 62 to a lever 63 which in turn is pivoted at 64 to an extension 65 of the bracket 55. The free end of the lever 63 has a roller or pin 66 for a purpose which will be presently explained.

A pair of rock shafts 70 and 71 are carried by the ends of brackets 74 secured to the angle iron 25. The shafts are square shaped in cross section, and snugly fit square passages 75 in the respective rockable bearings 72 and 73. The shaft 70 is mounted in bearings 72, while the shaft 71 is mounted in bearings 73.

The shaft 70 is provided with a keeper generally designated by the numeral 77 which has a right angular portion consisting of the legs 78 and 79. At the junction of said legs is formed a socket, square shaped in cross section, to receive the shaft 70. An angular member 80 cooperates with the legs to form said socket. The keeper may be secured to the shaft in any approved manner. The free end of the leg 78 engages the angle iron 25 and is maintained normally in this position by a spring 81 connected between said leg and the lever 63. The keeper has a curved arm 82 for a purpose which will be presently explained. A finger 83 projects downwardly from the leg 79 and engages the pin or roller 66.

At the outer face of the wheel 34 is located a similar keeper 77a and the operating mechanism connected with the keeper 77 is duplicated for the keeper 77a, but said keeper is attached to the shaft 71 and a pin 59a on the outer face of the wheel 34 operates the cam member 58a.

The shaft 70 has a plurality of spaced fingers 85 adapted to engage simultaneously one of the series of spades secured to the hubs 43. The shaft 71 has a plurality of spaced fingers 86 adapted to engage the free end of a spade connected to the hubs 42 for retaining the spade stationary for digging a hollow or basin. The spades connected to the hubs 42 are retained in operative relation alternately with the spades connected to the hubs 43 for staggering the basins over the field.

The fingers 85 and 86 are secured to their respective shafts by means of square collars 90 and set screw 91. The fingers 85 are bent and are longer than the fingers 86 because the shaft 70 is at a greater distance from the tips of the spades than the shaft 71.

The operation of our device is as follows:—

The wheels when the machine is being drawn along a path, are at a much lower elevation than the tips of the spades. In other words, the spades are elevated above the road bed and the pins 59 and 59a are far enough below the keepers 77 and 77a that they will not operate said keepers. The elevation of the chassis and the spades is produced by pushing on the levers 35. A pull on said levers lowers the chassis and likewise the spades so that the pins 59 and 59a will contact with the respective cams 58 and 58a. When the chassis has been lowered the tips of the spades are ready to enter the soil.

When the machine is drawn down the field by a cultivator, tractor or other farming implement, the wheels 33 and 34 are revolved by traction with the ground and the spades are revolved by the points of said spades engaging the ground. When the free ends of the spades engage the fingers 85 or 86 they are held against rotation and a preceding spade digs into the ground and forms a basin or hollow. The basins are alternately formed by the spades connected with the hubs 42 and 43 so that the basins made by alternate groups of spades will be staggered relative to each other. This is due to the fact that the spades in one group are released by pin 59 engaging the cam 58, while the other group of spades is released by the pin 59a engaging the cam 58a. The pins 59 and 59a are located at 180 degrees apart. Thus one group of spades is held operative while the other or alternate groups are free to rotate.

When a pin 59 or 59a engages its respective cam 58 or 58a, the allied keeper is rocked by the spring 81 when the lever 63 is moved to the right in Figure 3, releasing the roller or pin 66 from the leg 79 when the curved arm 82 rides over said roller. The finger 83 holds the lever 63 in a predetermined position so that the lever 63 will normally support the keeper.

When the parts are returned to normal position, the roller 66 rides downwardly over the curved member 82 to seat against the finger 83.

It will be apparent that by reversing the V-shaped front spades and enlarging them, lister furrows may be readily dammed.

We claim:

1. A device for digging basins in a field comprising a chassis, wheels for supporting the chassis, an axle carried by the chassis, a plurality of spaced spades mounted for revolution on the axle, means for holding alternate spades against rotation, means for retaining the remaining spades against revolution when the first spades have been released, means for periodically releasing the first spades for revolution and means for releasing the second spades periodically and alternately with the first spades, the releasing means for both sets of spades being actuated by a pair of means on one of the supporting wheels.

2. A device for digging basins in a field comprising a chassis, wheels for supporting the chassis, an axle carried by the chassis, a plurality of spaced spades mounted for revolution on the axle, means for holding alternate spades against revolution, means for retaining the remaining spades against revolution when the first spades have been released, means for periodically releasing the first spades for revolution and means for releasing the second spades periodically and alternately with the first spades, the releasing means for both sets of spades being actuated by a pair of means on one of the supporting wheels, one of the means of the pair being located 180 degrees from the other means of the pair.

3. A device for digging basins in a field comprising a frame, wheels supporting the frame, an axle carried by the frame, spaced hubs rotatable on the axle, spades radiating from the hubs, means for retaining alternate hubs and likewise the attached spades against rotation, means for retaining the other hubs against rotation alternately with the first mentioned hubs, means for each retaining means and operated by one of the supporting wheels for causing release of the retaining means.

4. A device for digging basins in a field comprising a frame, wheels supporting the frame, an axle carried by the frame, spaced hubs rotatable on the axle, spades radiating from the hubs, means for retaining alternate hubs and likewise the attached spades against rotation, means for retaining the other hubs against rotation alternately with the first mentioned hubs, means for each retaining means and operated by a wheel for causing release of the retaining means, the releasing means including a rockable cam, a pin on the wheel periodically engaging said cam, means connected with the cam for holding the retaining means operative but releasing said retaining means when the cam is rocked.

5. A device for digging basins in a field comprising a frame, wheels supporting the frame, an axle carried by the frame, spaced hubs rotatable on the axle, spades radiating from the hubs, means for retaining alternate hubs and likewise the attached spades against rotation, means for retaining the other hubs against rotation alternately with the first mentioned hubs, means for each retaining means and operated by a wheel for causing release of the retaining means, said retaining means including a shaft provided spaced fingers to engage certain spades and lock said spades against movement, a rockable keeper connected to the shaft, means connected with the releasing means for retaining the keeper connected to the shaft, means connected with the releasing means for retaining the keeper against movement.

6. A device for digging basins in a field comprising a chassis, wheels for supporting said chassis, an axle carried by the chassis, a plurality of spaced spades mounted for revolution on the axle, means for holding alternate spades against rotation, means for retaining the remaining spades against revolution when the first spades have been released, means for periodically releasing the first spades for revolution and means for releasing the second spades periodically and alternately with the first spades, means for raising or lowering the chassis so that the spades will penetrate the soil.

7. A device for digging basins in a field comprising a frame, wheels supporting the frame, an axle carried by the frame, spaced hubs rotatable on the axle, spades radiating from the hubs, means for retaining alternate hubs and likewise the attached spades against rotation, means for retaining the other hubs against rotation alternately with the first mentioned hubs, means for each retaining means and operated by a wheel for causing release of the retaining means, means on the wheel engageable with the releasing means, means for lowering the frame on the wheel so that the means on the wheel will engage the releasing means.

JESSE I. WILCOXEN, Sr.
JESSE I. WILCOXEN, Jr.